United States Patent [19]
Caldwell et al.

[11] 3,739,652
[45] June 19, 1973

[54] SWING TRANSMISSION FOR EXCAVATORS

[75] Inventors: Samuel I. Caldwell, Aurora; Lawrence R. Cline, Oswego, both of Ill.

[73] Assignee: Caterpillar Tractor Co., Peoria, Ill.

[22] Filed: Mar. 23, 1972

[21] Appl. No.: 237,377

[52] U.S. Cl. ............................. 74/421 A, 212/69
[51] Int. Cl. ...................... F16h 1/20, B66c 23/84
[58] Field of Search ................. 212/69; 74/421 A, 74/660, 803

[56] References Cited
UNITED STATES PATENTS

| | | | |
|---|---|---|---|
| 604,900 | 5/1898 | Lancaster | 212/69 X |
| 1,959,533 | 5/1934 | Iverson | 212/69 |
| 1,969,871 | 8/1934 | Bernhard | 212/69 UX |
| 3,424,318 | 1/1969 | Lorence | 212/69 |

Primary Examiner—Leonard H. Gerin
Attorney—Paul S. Lempio

[57] ABSTRACT

An excavator comprises a revolving upper unit rotatably mounted on a tracked undercarriage. The upper unit has a power transmission removably mounted thereon comprising a speed reduction gear train and an operatively connected cartridge assembly which terminates at a swing pinion. The upper unit is revolved on the undercarriage by selectively rotating the swing pinion against a reaction ring gear secured to the undercarriage. The cartridge assembly is removably mounted in the transmission and has axially spaced piloting lands formed thereon to facilitate expeditious and precise installation of the transmission on a support housing.

29 Claims, 4 Drawing Figures

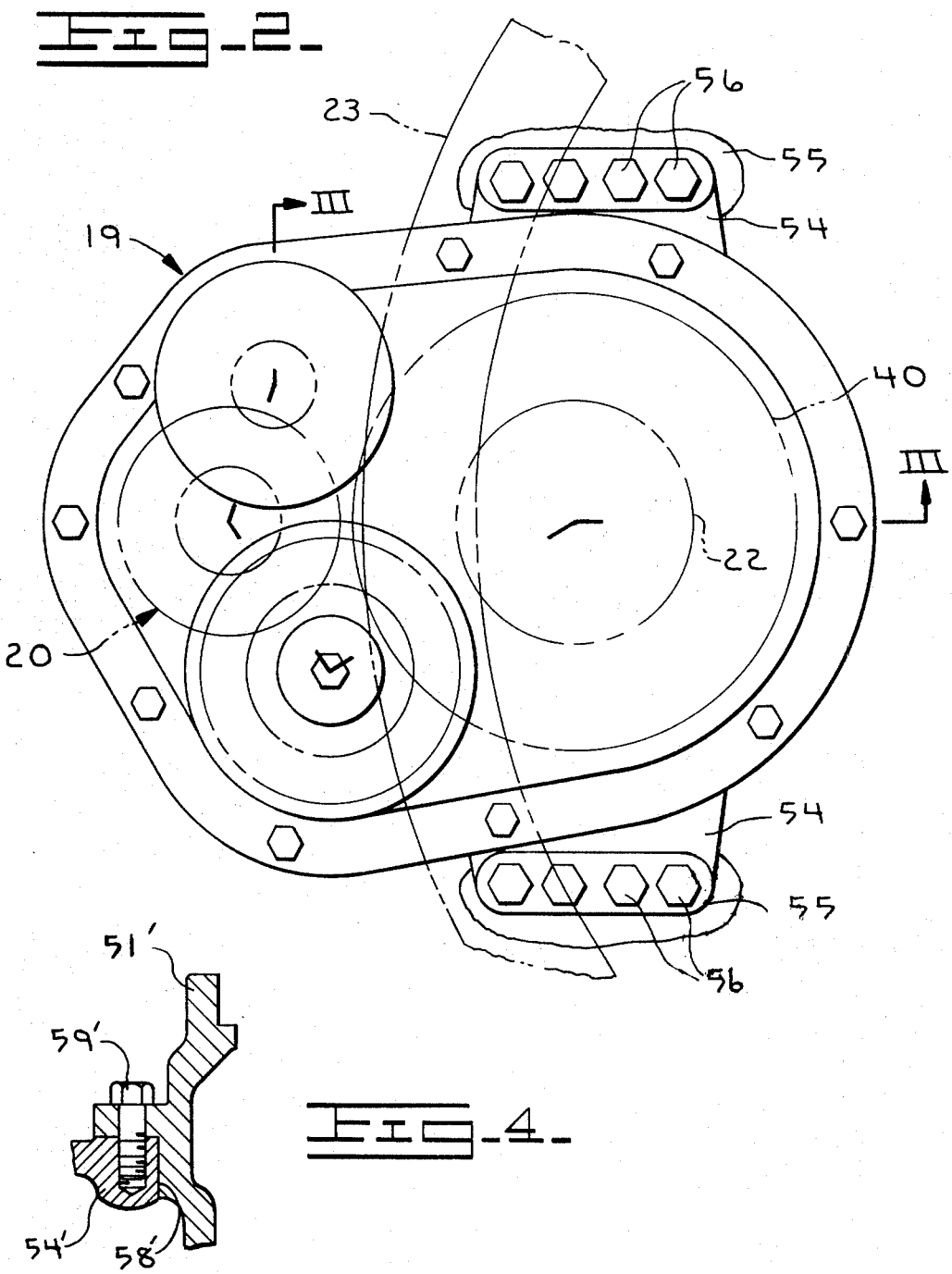

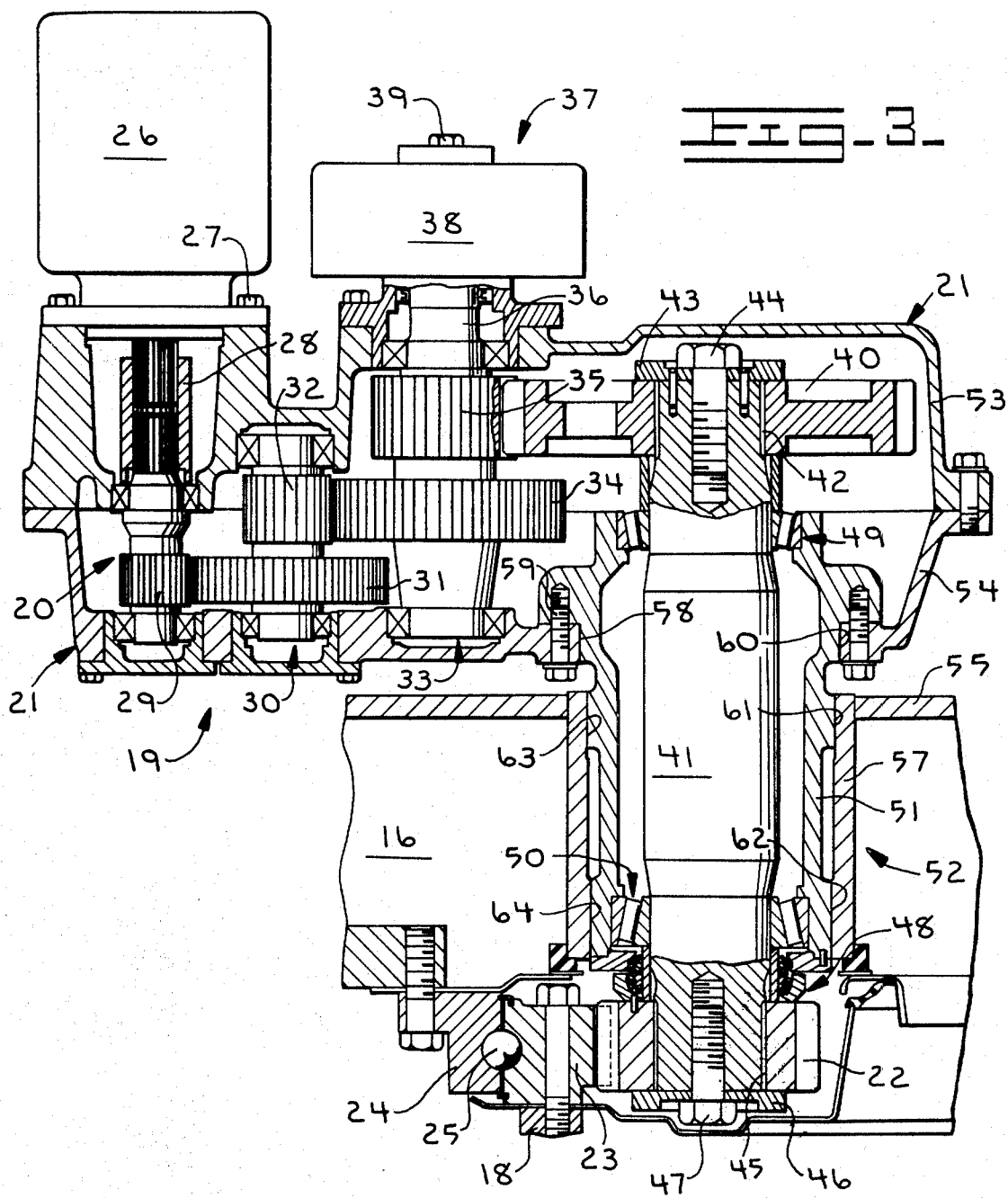

SWING TRANSMISSION FOR EXCAVATORS

BACKGROUND OF THE INVENTION

The present invention relates to a unitized power transmission, particularly adapted for use in a hydraulic excavator. Conventional power transmissions employed in excavators may include a motor-driven speed reduction gear train and a swing pinion which rotates against a stationary ring gear to selectively rotate an upper unit relative to a mobile undercarriage. The upper unit has an operator's station and a standard earthworking implement mounted thereon.

The servicing of components employed in the transmission is toilsome, primarily due to the inaccessibility of its component parts. Servicing is usually accomplished by removing the parts piece-meal, to thus greatly inhibit field servicing. Also, since the swing shaft employed therein is subjected to severe loading, precise adjustment of its support bearings is critical. Such bearings are normally adjusted after the transmission is installed in the excavator.

Another problem arising with respect to a conventional transmission relates to the disposition of means employed to attach the transmission in place on a support structure. In particular, such disposition does not always assure substantial absorption of the high shear loads imposed thereon during excavator operation. In addition, difficulties are normally encountered when the transmission is installed due to the lack of means for accurately piloting the transmission's swing shaft in place on a support structure to assure precise meshing of internal gearing.

SUMMARY AND OBJECTS OF THE INVENTION

An object of this invention is to overcome the above, briefly described problems by providing a compact and readily serviceable transmission, particularly adapted for use in an earthworking machine, such as a hydraulic excavator. The transmission is adapted for expeditious attachment to a support structure and exhibits a high degree of structural integrity and ability to absorb high shear loads imposed thereon during operation.

Another object of the invention is to provide the transmission with a removable cartridge assembly which contains a preassembled swing shaft rotatably mounted therein by preadjusted bearings.

Another object of the invention is to provide piloting means for accurately piloting the transmission into operative alignment on the support structure.

Other objects of this invention will become apparent with reference to the accompanying drawings and following description.

BRIEF DESCRIPTION OF THE DRAWINGS

FIG. 2 is a schematic, top plan view of the transmission and attendant support structures.

FIG. 3 is a vertical section of the transmission taken along line III—III in FIG. 2.

FIG. 4 is a fragmentary view, showing a modified mounting arrangement for a cartridge assembly employed in the transmission.

DESCRIPTION OF THE PREFERRED EMBODIMENT

Figure 1:
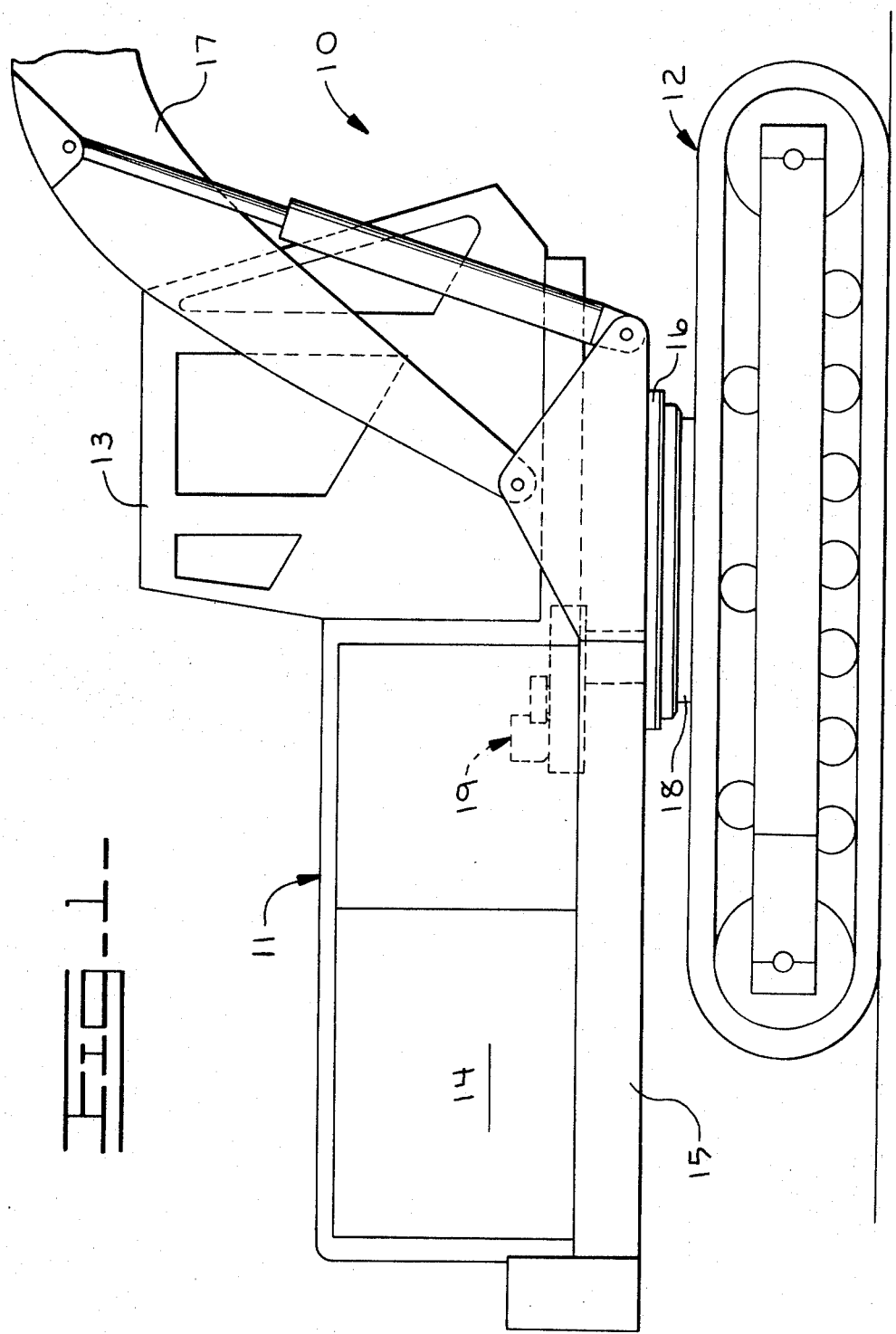
FIG. 1 is a partial, side elevational view of a hydraulic excavator, showing the general location of a swing transmission of the subject invention in broken lines.

Referring to FIG. 1, an earthworking machine such as a hydraulic excavator 10 has an upper unit 11 rotatably mounted on a tracked, mobile undercarriage 12. The upper unit includes an operator's station 13 and a power plant 14 carried by a common frame 15 having a support housing or annular turntable 16 thereunder. A standard earthworking implement may be suitably attached to a partially illustrated boom 17, pivotally mounted on the front end of upper unit 11. The upper unit is adapted to be selectively rotated on a base 18 of the undercarriage by a detachable power transmission 19 which is the subject of this invention.

Referring to FIGS. 2 and 3, the transmission comprises a speed reduction gear train 20 mounted within a hollow case 21, secured to housing 16 which functions as a support. The gear train drives a swing pinion 22 against a stationary reaction-type ring gear 23, secured to base 18, to rotate housing 16 and upper unit 11 relative to undercarriage 12. Housing 16 is secured to a large, annular turntable 24, rotatably mounted on the periphery of ring gear 23 by radially disposed ball bearings 25.

An operator-controlled hydraulic motor 26 is attached to case 21 by bolts 27 to selectively drive swing pinion 22 through interconnecting speed reduction gear train 20. An internally splined sleeve 28 connects the motor's output shaft to an input pinion 29 of the gear train. The input pinion sequentially drives a first cluster gear 30, including a large spur gear 31 and smaller spur gear 32. Gear 32 drives a second cluster gear 33, including a large spur gear 34 and smaller spur gear 35 mounted on a common shaft 36.

The shaft extends upwardly for selective engagement with a conventional braking means 37. The braking means may include a normally rotating drum 38, secured to the end of the shaft by a bolt 39 and a spline connection (not shown). The drum may be selectively engaged internally by relatively stationary and expandable brake shoes (not shown) to hold the drum firmly with respect to case 21 to prevent rotation of swing pinion 22.

Gear 35 meshes with a large spur gear 40, secured to the upper end of a swing or output shaft 41 by a spline connection 42, a doweled adapter plate 43 and a retaining bolt 44. Swing pinion 22 is secured to the lower end of the swing shaft by a spline connection 45, an adapter plate 46 and a large bolt 47. A floating ring type seal group 48 may be suitably disposed adjacent to a swing pinion to retain lubricating oil in the transmission.

Gear 40, output 41, and swing pinion 22 are supported for rotation by anti-friction bearings, such as a pair of axially spaced, tapered roller bearings 49 and 50. The pre-adjusted bearings are mounted within a cylindrical housing 51 to form a removable cartridge assembly 52. Input pinion 29 and cluster gears 30 and 33 may be similarly mounted on axially spaced anti-friction bearings, schematically illustrated in FIG. 3.

Reduction gear case 21, including cover 53 detachably secured to a lower case member 54, is solely secured by flanges extending from member 54 to a deck plate 55 of housing 16 by fastening means, such as bolts 56 (FIG. 2). The two groups of diametrically opposed and closely spaced bolts are arranged to aid in absorbing the shear loads imposed on case 21 when upper unit 11 is rotated relative to the undercarriage. Transmission 19 may be conveniently detached from housing 16 by merely removing bolts 56 and by removing the substantial lower portion of housing 51 which is mounted in a cylindrical, piloting sleeve bushing 57 secured to housing 16.

Removal of cover 53 and its attached mechanisms from lower case member 54 will fully expose cartridge assembly 52. The cartridge assembly may be moved upwardly through an opening 58 of the lower case member by solely releasing radially disposed bolts 59, positioned on the underside of case member 54. A cable (not shown) may be wrapped around shaft 41, beneath gear 40, to lift and detach the cartridge assembly from the lower case member.

FIG. 3 clearly illustrates three axially spaced and progressively smaller piloting diameters formed on cylindrical housing 51 of the cartridge assembly at axially spaced lands 60, 61 and 62, respectively. Upper land 60 has a diametrical minus tolerance in the order several thousandths of an inch (e.g., minus 0.003 in.) with respect to opening 58 (FIG. 3) to accurately mesh pairs of gears 35–40 and 22–23 together and to minimize shear loads imposed on bolts 59. Piloting lands 61 and 62 have like minus diametrical tolerances with respect to bores 63 and 64, respectively, formed internally on sleeve bushing 57 to directly transfer substantially all of the bending loads to support housing 16.

The piloting means comprising lands 60, 61 and 62 and closely toleranced opening 58 and bores 63 and 64 facilitates expeditious and precise insertion of the cartridge assembly into sleeve bushing 57. In particular, the close diametrical fits at lands 61 and 62 are only experienced during the last few inches of insertion of the cartridge assembly. In addition, manufacturing economies are realized since the opening and the aligned bore formed through sleeve bushing 57 need not constitute a constant, closely toleranced diameter throughout its length, requiring special tooling.

FIG. 4 illustrates a modified transmission mounting arrangement for securing a cylindrical housing 51' of a cartridge assembly, substantially identical to cartridge assembly 52, to a lower case member 54'. The housing is piloted within an opening 58' formed in the case member and is secured thereto by a plurality of removable retaining bolts 59'. The bolts are accessible from the top of the cartridge assembly, in contrast to the FIG. 3 mounting arrangement wherein bolts 57 are located beneath case member 54.

What is claimed is:

1. An earthworking machine comprising
an upper unit having a support secured thereunder,
a mobile undercarriage having a reaction ring gear secured thereto,
means rotatably mounting said support on said undercarriage, and
a power transmission comprising a hollow case detachably connected to said support, a speed reduction gear train mounted in said case and a cartridge assembly, said cartridge assembly comprising a housing detachably connected to said case, a swing shaft rotatably mounted in said housing, a spur gear attached to said swing shaft and operatively connected to said gear train and a swing pinion attached to said swing shaft and positioned thereon to mesh with said ring gear.

2. The invention of claim 1 wherein said case is solely connected to said support by two groups of closely spaced fastening means which are diametrically opposed on opposite sides of said cartridge assembly.

3. The invention of claim 1 wherein said case comprises a cover detachably connected to a lower case member and said housing is detachably connected to said lower case member whereby removal of said cover will fully expose said cartridge assembly for removal from said lower case member.

4. The invention of claim 1 further comprising a motor attached to said case and operatively connected to said gear train for selectively rotating said swing pinion.

5. The invention of claim 4 further comprising braking means attached to said case and operatively connected to said gear train for selectively preventing rotation of said swing pinion.

6. The invention of claim 4 wherein said gear train sequentially comprises an input pinion operatively connected to an output shaft of said motor to be driven thereby, a first cluster gear operatively connected to said input pinion and a second cluster gear operatively connected to said first cluster gear and to said spur gear.

7. The invention of claim 1 wherein said support comprises an annular turntable rotatably mounted on the periphery of said ring gear.

8. The invention of claim 1 wherein said support has a sleeve bushing mounted therein, a substantial lower portion of said housing mounted in said sleeve bushing.

9. The invention of claim 8 further comprising cooperating piloting means formed internally on said sleeve bushing and externally on said housing for precisely guiding said swing pinion and said spur gear into operative engagement with said ring gear and said gear train, respectively.

10. The invention of claim 9 wherein said piloting means comprises a plurality of axially spaced lands formed externally on said housing, the diameters of said lands being progressively smaller in a downward direction toward said swing pinion.

11. The invention of claim 10 wherein said piloting means further comprises an opening formed through said case and wherein one of said lands is closely seated within said opening.

12. The invention of claim 1 wherein said swing shaft is rotatably mounted in said housing by axially spaced and preadjusted anti-friction bearings.

13. A power transmission adapted for use in an earthworking machine comprising
a hollow case,
a speed reduction gear train mounted in said case, and
a cartridge assembly including a housing detachably connected to said case and having a cylindrical portion extending downwardly through said case, a swing shaft, axially spaced bearing means rotatably mounting said swing shaft in said housing and upper and lower gears connected to opposite ends of said swing shaft, said upper gear positioned within said case and operatively connected to said gear train and said lower gear positioned exteriorly of said housing.

14. The invention of claim 13 wherein said case comprises a cover detachably connected to a lower case member, said housing detachably connected to said lower case member whereby removal of said cover will fully expose said cartridge assembly for removal from said lower case member.

15. The invention of claim 13 further comprising a motor attached to said case and operatively connected to said gear train for selectively rotating said lower gear.

16. The invention of claim 15 further comprising braking means attached to said case and operatively connected to said gear train for selectively preventing rotation of said lower gear.

17. The invention of claim 15 wherein said gear train sequentially comprises an input pinion operatively connected to an output shaft of said motor to be driven thereby, a first cluster gear operatively connected to said input pinion and a second cluster gear operatively connected to said first cluster gear and to said upper gear.

18. The invention of claim 8 further comprising piloting means for precisely guiding said upper and lower gears into operative engagement with other gears, said piloting means comprising a plurality of axially spaced lands formed externally on said housing, the diameters of said lands being progressively smaller in a downward direction toward said lower gear.

19. The invention of claim 18 wherein said piloting means further comprises an opening formed through said case and wherein an upper one of said lands is closely seated within said opening.

20. The invention of claim 13 wherein said swing shaft is rotatably mounted in said housing by axially spaced and preadjusted anti-friction bearings.

21. A power transmission adapted for use in an earth-working machine comprising
a hollow case,
a gear train mounted in said case,
a cylindrical housing extending downwardly from said case,
a swing shaft rotatably mounted in said housing and operatively connected to said gear train, and
piloting means comprising a plurality of axially spaced lands formed externally on said housing, the diameters of said lands being progressively smaller in a downward direction.

22. The invention of claim 21 wherein said case comprises a cover detachably connected to a lower case member, said housing detachably connected to said lower case member whereby removal of said cover will fully expose said housing and swing shaft for removal from said lower case member.

23. The invention of claim 21 further comprising a motor attached to said case and operatively connected to said gear train for selectively rotating said swing shaft.

24. The invention of claim 23 further comprising braking means attached to said case and operatively connected to said gear train for selectively preventing rotation of said swing shaft.

25. The invention of claim 23 wherein said gear train sequentially comprises an input pinion operatively connected to an output shaft of said motor to be driven thereby, a first cluster gear operatively connected to said input pinion and a second cluster gear operatively connected to said first cluster gear and to said swing shaft.

26. The invention of claim 21 further comprising a support having a cylindrical sleeve bushing mounted therein, a substantial lower portion of said housing mounted in said sleeve bushing.

27. The invention of claim 26 further comprising piloting means formed internally on said sleeve bushing to cooperate with the piloting means formed on said housing for precisely guiding said housing into said sleeve bushing.

28. The invention of claim 27 wherein said piloting means further comprises an opening formed through said case and wherein one of said lands is closely seated within said opening.

29. The invention of claim 1 wherein said swing shaft is rotatably mounted in said housing by axially spaced and preadjusted anti-friction bearings.

* * * * *